(12) United States Patent
Kim et al.

(10) Patent No.: US 7,154,896 B1
(45) Date of Patent: Dec. 26, 2006

(54) ATM TRAFFIC HAVING UNKNOWN CHARACTERISTICS INCLUDING TRAFFIC WITH WEIGHTED PRIORITIES AND TRAFFIC WITHOUT WEIGHTED PRIORITIES

(75) Inventors: Hyong S. Kim, Pittsburgh, PA (US); Robert D. Sansom, Pittsburgh, PA (US); Lawrence R. Cleeton, Butler, PA (US)

(73) Assignee: Ericsson, AB, Stockholm (SE)

( * ) Notice: Subject to any disclaimer, the term of this patent is extended or adjusted under 35 U.S.C. 154(b) by 0 days.

(21) Appl. No.: 09/282,748

(22) Filed: Mar. 31, 1999

Related U.S. Application Data

(60) Provisional application No. 60/094,055, filed on Jul. 24, 1998.

(51) Int. Cl.
*H04L 12/28* (2006.01)
(52) U.S. Cl. .................. 370/395.43; 370/232; 370/429
(58) Field of Classification Search ............................... 370/395.1–395.43, 230–235, 236.2, 412–429
See application file for complete search history.

(56) References Cited

U.S. PATENT DOCUMENTS

| | | | | |
|---|---|---|---|---|
| 5,850,399 A | * | 12/1998 | Ganmukhi et al. | 370/412 |
| 6,049,526 A | * | 4/2000 | Radhakrishnan et al. | 370/229 |
| 6,104,698 A | * | 8/2000 | Fan et al. | 370/232 |
| 6,240,102 B1 | * | 5/2001 | Asano | 370/468 |
| 6,408,005 B1 | * | 6/2002 | Fan et al. | 370/412 |
| 6,414,963 B1 | * | 7/2002 | Gemar | 370/412 |

OTHER PUBLICATIONS

Kai-Yeung Siu et al., "Virtual Queueing Techniques for UBR+ Service in ATM with Fair Access and Minimum Bandwidth Guarantee," Global Telecommunications Conference, Globecom '97, IEEE, p. 1081-1085, (Nov. 3, 1997).

Shinohara, M. et al., "Multiclass Large Scale ATM Switch with QoS Guarantee," 1997 IEEE International Conference on Communications (Montreal), p. 453-461, (Jun. 8, 1997).

Sung Won Lee et al., "Improved Dynamic Weighted Cell Scheduling Algorithm Based on Earliest Deadline First Scheme for Various Traffics of ATM Switch," Global Telecommunications Conference, 1996, p. 1959-1963.

* cited by examiner

*Primary Examiner*—Chi Pham
*Assistant Examiner*—Phuc Tran
(74) *Attorney, Agent, or Firm*—Ansel M. Schwartz

(57) ABSTRACT

An ATM communication system. The system includes a source which produces traffic for connections having known traffic characteristics and unknown traffic characteristics. The traffic has unknown characteristics including traffic with weighted priorities and traffic without weighted priorities. The system includes a network on which traffic travels. The source is connected to the network. The source sends the traffic having known traffic characteristics and unknown traffic characteristics onto the network. The system includes a destination which is connected to the network and receives the traffic having known traffic characteristics and unknown traffic characteristics. A source for producing ATM traffic for a network with switches. A switch for switching traffic on an ATM network from a source to a destination. A method for transferring in an ATM communication system.

30 Claims, 2 Drawing Sheets

ATM TRAFFIC HAVING UNKNOWN CHARACTERISTICS INCLUDING TRAFFIC WITH WEIGHTED PRIORITIES AND TRAFFIC WITHOUT WEIGHTED PRIORITIES

This application claims the benefit of U.S. Provisional Application No. 60/094,055 filed Jul. 24, 1998.

FIELD OF THE INVENTION

The present invention is related to ATM traffic having unknown characteristics including traffic with weighted priorities and traffic without weighted priorities. More specifically, the present invention is related to UBR connection traffic with weighted priorities (UBRw VC) and the traffic having unknown characteristics without weighted priorities is UBR VC traffic.

BACKGROUND OF THE INVENTION

Although CBR, VBR, ABR and UBR traffic classes are designed to support existing and forthcoming services, it is difficult to take full advantage of such flexibility since many data services have unknown traffic characteristics. There is much confusion among users when they are asked to provide UPC parameters for their network services.

The UBR traffic class is specifically designed to provide data services with unknown traffic characteristics. No parameters need to be specified for UBR and it provides the simplest user interface. In fact, UBR is the dominant traffic class in most enterprise networks and in many of the Internet backbone networks built on ATM.

However, new specifications such as IEEE 802.1p/Q specification and IETF Differentiated Services (incorporated by reference herein) are being developed and will likely see widespread deployment over the coming years. Both of these specifications do not assume any knowledge of the traffic characteristic, only that some traffic is "more important", in some sense, than others. These service specifications do not directly map into any existing ATM service classes. (Note that the IETF Integrated Services specification already maps directly into ATM service classes since it assumes that the traffic can be specified.)

In the current ATM specification, there is no way of distinguishing data traffic priority within the UBR traffic class. In order to provide this support, the present invention pertains to a UBRw traffic class within UBR. It enables both IEEE 802.1p/Q and IETF Differentiated Services to map directly into the ATM UBR service class. Without the UBRw traffic class, ATM's growth in the Internet and enterprise network will be limited.

Some examples of such distinguished data traffic include:
  A set of network end-points with better than UBR traffic QOS with unspecified UPC parameters.
  A set of applications with better than UBR traffic QOS with unspecified UPC parameters.
  An ISP could offer different grades of services to customers who require UBR traffic class.
  Corporate VPNs can have different grades of services.

Together with ATM's scalability and manageability, UBRw service would be very attractive to many ISPs. It would also be equally beneficial in enterprise ATM networks.

The present invention describes UBRw, a weighted traffic service within the UBR traffic class. UBRw allows for support of both IEEE 802.1p/Q and IETF Differentiated Services traffic classes. In addition, it eases the problem of specifying UPC for services without well-known traffic characteristics but with relative priority requirements.

SUMMARY OF THE INVENTION

The present invention pertains to an ATM communication system. The system comprises a source which produces traffic for connections having known traffic characteristics and unknown traffic characteristics. The traffic has unknown characteristics including traffic with weighted priorities and traffic without weighted priorities. The system comprises a network on which traffic travels. The source is connected to the network. The source sends the traffic having known traffic characteristics and unknown traffic characteristics onto the network. The system comprises a destination which is connected to the network and receives the traffic having known traffic characteristics and unknown traffic characteristics.

The present invention pertains to a source for producing ATM traffic for a network with switches. The source comprises a mechanism which produces traffic for connections having unknown traffic characteristics. The traffic includes traffic with weighted priorities and traffic without weighted priorities. The source comprises a mechanism for transmitting the traffic to the network.

The present invention pertains to a switch for switching traffic on an ATM network from a source to a destination. The switch comprises a mechanism for receiving traffic for connections having unknown traffic characteristics. The traffic includes traffic with weighted priorities and traffic without weighted priorities. The switch comprises a mechanism for transmitting the traffic for connections to the network. The transmitting mechanism is connected to the receiving mechanism. The switch comprises a scheduler for scheduling when the connections having traffic with unknown characteristics having weighted priorities are to be transmitted to the network. The scheduler is connected to the transmitting mechanism and the receiving mechanism.

The present invention pertains to a method for transferring traffic in an ATM communication system. The method comprises the steps of transmitting from a source traffic of a connection having unknown traffic characteristics with a weighted priority onto an ATM network. Then there is the step of transmitting from the source traffic of another connection having unknown traffic characteristics without a weighted priority onto the ATM network.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
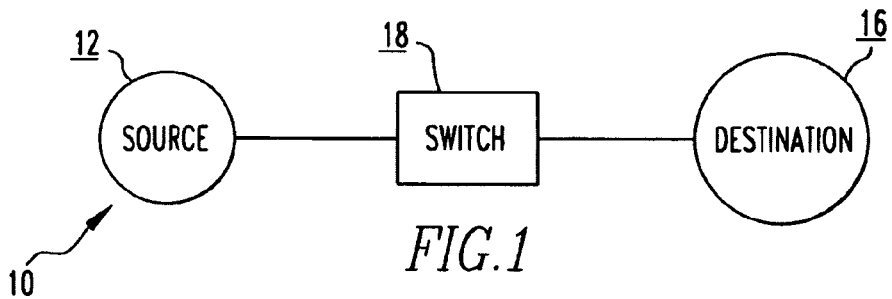
FIG. 1 is a schematic representation of a system of the present invention.

Referring now to the drawings wherein like reference numerals refer to similar or identical parts throughout the several views, and more specifically to FIG. 1 thereof, there is shown an ATM communication system 10. The system 10 comprises a source 12 which produces traffic for connections having known traffic characteristics and unknown traffic characteristics. The traffic has unknown characteristics including traffic with weighted priorities and traffic without weighted priorities. The system 10 comprises a network 14 on which traffic travels. The source 12 is connected to the network 14. The source 12 sends the traffic having known traffic characteristics and unknown traffic characteristics onto the network 14. The system 10 comprises a destination 16 which is connected to the network 14 and receives the traffic having known traffic characteristics and unknown traffic characteristics. Preferably, the system 10 includes a switch 18 connected to the network 14 which switches the traffic from the source 12 to the destination 16.

Figure 2:
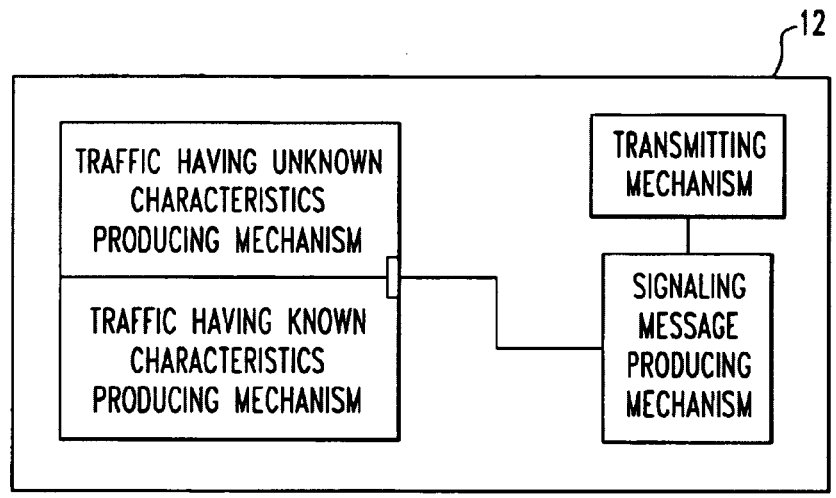
FIG. 2 is a schematic representation of a source of the present invention.

The present invention pertains to a source 12, as shown in FIG. 2, for producing ATM traffic for a network 14 with switches 18. The source 12 comprises a mechanism which produces traffic for connections having unknown traffic characteristics. The traffic includes traffic with weighted priorities and traffic without weighted priorities. The source 12 comprises a mechanism for transmitting the traffic to the network 14.

Preferably, the connections with traffic having unknown characteristics with weighted priorities are UBR connection traffic with weighted priorities (UBRw VC) and the traffic having unknown characteristics without weighted priorities is UBR VC traffic. The UBRw VC traffic preferably has multiple weighted priorities.

Preferably, the source 12 includes a mechanism for providing traffic having known traffic characteristics to the network 14. The traffic having known traffic characteristics is preferably either ABR, CBR, VBR or a combination of the same. Preferably, the source 12 includes a mechanism which produces a signaling message that identifies to switches 18 of the network 14 the weight of each UBRw VC.

The weight of the UBRw VC preferably specifies a relative priority among UBR VC and UBRw VC traffic. Preferably, the UBRw VCs having a higher weight receive a larger share of available bandwidth of the network 14. Each UBRw VC has preferably N bits associated with it which corresponds to the weight of its priority.

Figure 3:
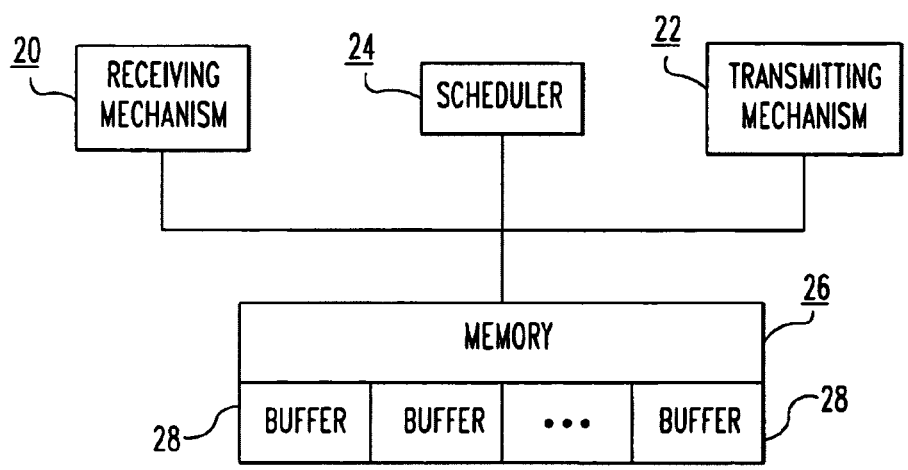
FIG. 3 is a schematic representation of a switch of the present invention.

The present invention pertains to a switch 18, as shown in FIG. 3, for switching traffic on an ATM network 14 from a source 12 to a destination 16. The switch 18 comprises a mechanism for receiving traffic for connections having unknown traffic characteristics. The traffic includes traffic with weighted priorities and traffic without weighted priorities. The switch 18 comprises a mechanism for transmitting the traffic for connections to the network 14. The transmitting mechanism 22 is connected to the receiving mechanism 20. The switch 18 comprises a scheduler 24 for scheduling when the connections having traffic with unknown characteristics having weighted priorities are to be transmitted to the network 14. The scheduler 24 is connected to the transmitting mechanism 22 and the receiving mechanism 20.

Preferably, the connections with traffic having unknown characteristics with weighted priorities are UBR connection traffic with weighted priorities (UBRw VC) and the traffic having unknown characteristics without weighted priorities is UBR VC traffic.

The switch 18 preferably includes a memory 26 for storing the connections. The memory 26 is connected to the receiving mechanism 20, the scheduler 24 mechanism and the transmitting mechanism 22. Preferably, the memory 26 includes buffers 28 which are allocated according to the VC weight to give higher priority to the VCS with higher weight. The receiving mechanism 20 preferably also receives traffic having known characteristics of either ABR, CBR, VBR or a combination of the same. Preferably, the scheduler 24 utilizes weighted round robin scheduling to schedule when the UBRw VCs are to be transmitted by the transmitting mechanism 22.

Figure 4:
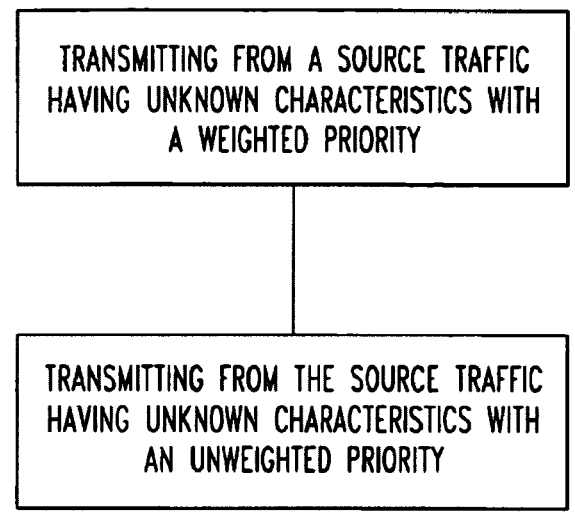
FIG. 4 is a flow chart of a method of the present invention.

The present invention pertains to a method, as shown in FIG. 4, for transferring traffic in an ATM communication system 10. The method comprises the steps of transmitting from a source 12 traffic of a connection having unknown traffic characteristics with a weighted priority onto an ATM network 14. Then there is the step of transmitting from the source 12 traffic of another connection having unknown traffic characteristics without a weighted priority onto the ATM network 14.

Before the step of transmitting the traffic of the connection having unknown traffic characteristics with a weighted priority, there is preferably the step of assigning a priority to the connection having unknown traffic characteristics with a weighted priority. Preferably, after the assigning step, there is the step of sending a signaling message from the source 12 to a switch 18 on the network 14 which is to receive the traffic of the connection having unknown traffic characteristics with a weighted priority so the switch 18 sets up a scheduling process corresponding with the weight of the priority of the connection having unknown traffic characteristics with a weighted priority.

The transmitting the traffic of the connection having unknown traffic characteristics with a weighted priority preferably includes the step of transmitting traffic of a UBR connection with a weighted priority (UBRw VC) and the step of transmitting traffic of another connection having unknown traffic characteristics without a weighted priority includes the step of transmitting traffic of a UBR connection without a weighted priority (UBR VC).

Preferably, after the assigning step, there is the step of transmitting from the source 12 traffic having known traffic characteristics of either ABR, CBR, VBR or a combination of the same. After the transmitting the UBRw VC step, there is preferably the step of receiving the UBRw VC at the switch 18. Preferably, after the receiving step, there is the step of scheduling the UBRw VC for transmission by the switch 18 onto the network 14 toward a destination 16 based on weighted round robin.

In the operation of the preferred embodiment, the distinction between UBRw and UBR is that UBRW has multiple weighted priorities (N bits, where, for example, N=8) in terms of cell delivery. The given priority is only meaningful relative to other connections with lower or higher priority. It is not intended to provide loss nor delay guarantees. UBRw VC would be identical to UBR VC except that UBRw VC has a weight associated with it. These weights specify relative "importance" of the VC within UBR VCS. The weight of a priority class may be assigned so that the higher weighted UBRw VC gets bigger share of the available bandwidth than lower weighted VCS.

The weight of a UBRw VC is communicated to the switches 18. This can be done along the path during call set-up time. The weight information is to be included in the signaling message.

As an example, a call set-up and data transfer processes is described as follows.

A host requests a UBRw VC "A" with a weight of 8.

Another host requests a UBRw VC "B" with a weight of 4.

When each switch 18 in the path receives call set-up requests for VC "A" and VC "B", each switch 18 sets up a scheduling process with weight of 8 and 4 for VC "A" and VC "B" respectively.

Although other scheduling algorithm could be used, let's assume a weighted round robin scheduling for simplicity in this example.

The switch 18 with a weighted round robin scheduling will allocated weight of 8 and weight of 4 to VC "A" and "A" and "B". If we assume that the switch 18 has only two VCS ("A" and "B"), the scheduler 24 serves cells from VC "A" and "B" for 8 cycles and 4 cycles respectively (if cells are available).

Thus, the cells from VC "A" are served twice as much as the cells from VC "B". Therefore, VC "A" gets more bandwidth than VC "B" proportional to their respective weights.

Furthermore, buffers 28 in the switch 18 could be allocated according to VC weight to give higher priority to the VCS with higher weight as well.

Figure 5:
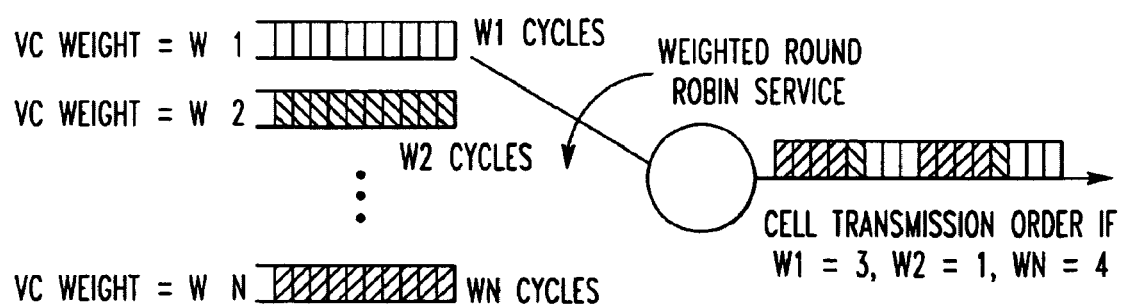
FIG. 5 is a schematic representation of scheduling of UBRw VCs in a switch.

FIG. 5 shows the scheduling of UBRw VCS in the switch 18. The right side of FIG. 5 shows the transmission order of cells from VCS if $W_1=3$, $W_2=1$, and $W_n=4$. The scheduler 24 may also serve cells in different order as long as the proportion of served cells matches the proportion of $W_1$, $W_2$, and $W_n$.

Once UBRW service is allowed in switches 18, IETF Differentiated Service and IEEE 802.1p/Q traffic can be easily mapped into ATM transport. UBRW would also help ISPs to offer different grade of services to their customers and make specification of UPC easy.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An ATM communication system comprising:

a source which produces traffic for connections having known traffic characteristics and unknown traffic characteristics with no parameters specified regarding the traffic itself, said traffic for connections having unknown characteristics including traffic for connections with weighted priorities relative to the connections and traffic for connections without weighted priorities relative to the connections;

a network on which traffic travels, said source connected to said network, said source sends said traffic for connections having known traffic characteristics and unknown traffic characteristics with no parameters specified onto the network and if the connection has a weighted priority, the weight of the priority is communicated to the network; and a destination which is connected to the network and receives the traffic for connections having known traffic characteristics and unknown traffic characteristics with no parameters specified.

2. A system as described in claim 1 including a switch connected to the network which switches the traffic from the source to the destination.

3. A system as described in claim 2 wherein the priority of connection is communicated to the switch during connection set-up by the source.

4. A source for producing ATM traffic for a network with switches comprising:

a mechanism which produces traffic for connections having unknown traffic characteristics with no parameters specified regarding the traffic itself, said traffic for connections including traffic for connections with weighted priorities relative to the connections and traffic for connections without weighted priorities relative to the connections; and a mechanism for transmitting the traffic to the network and if the connection has a weighted priority, the weight of the priority is communicated to the network.

5. A source as described in claim 4 wherein the connections with traffic having unknown characteristics with weighted priorities are UBR connection traffic with weighted priorities (UBRw VC) and the traffic having unknown characteristics without weighted priorities is UBR VC traffic.

6. A source as described in claim 5 wherein the UBRw VC traffic has multiple weighted priorities.

7. A source as described in claim 6 including a mechanism for providing traffic having known traffic characteristics to the network.

8. A source as described in claim 7 wherein the traffic having known traffic characteristics is either ABR, CBR, VBR or a combination of the same.

9. A source as described in claim 8 including a mechanism which produces a signaling message that identifies to switches of the network the weight of each UBRw VC.

10. A source as described in claim 9 wherein the weight of the UBRw VC specifies a relative priority among UBR VC and UBRw VC traffic.

11. A source as described in claim 10 wherein the UBRw VCS having a higher weight receive a larger share of available bandwidth of the network.

12. A source as described in claim 11 wherein each UBRw VC has N bits associated with it which corresponds to the weight of its priority.

13. A switch for switching traffic on an ATM network from a source to a destination comprising:

a mechanism for receiving traffic for connections having unknown traffic characteristics with no parameters specified regarding the traffic itself, said traffic for connections including traffic for connections with weighted priorities relative to the connections and traffic for connections without weighted priorities relative to the connections and if the connection has a weighted priority the weight of the priority is communicated from the network;

a mechanism for transmitting the traffic for connections to the network, said transmitting mechanism connected to the receiving mechanism; and a scheduler for scheduling when the connections having traffic with unknown characteristics having weighted priorities are to be transmitted to the network, said scheduler connected to the transmitting mechanism and the receiving mechanism.

14. A switch as described in claim 13 wherein the connections with traffic having unknown characteristics with weighted priorities are UBR connection traffic with weighted priorities (UBRw VC) and the traffic having unknown characteristics without weighted priorities is UBR VC traffic.

15. A switch as described in claim 14 including a memory for storing the connections, said memory connected to the receiving mechanism, the scheduler and the transmitting mechanism.

16. A switch as described in claim 15 wherein the memory includes buffers which are allocated according to the VC weight to give higher priority to the VCS with higher weight.

17. A switch as described in claim 16 wherein the receiving mechanism also receives traffic having known characteristics of either ABR, CBR, VBR or a combination of the same.

18. A switch as described in claim 17 wherein the scheduler utilizes weighted round robin scheduling to schedule when the UBRw VCS are to be transmitted by the transmitting mechanism.

19. A switch as described in claim 18 wherein priority of connection is communicated to the switch during connection set-up from the source.

20. A method for transferring traffic in an ATM communication system comprising the steps of:
   transmitting from a source traffic of a connection having unknown traffic characteristics with no parameters specified regarding the traffic itself with a weighted priority relative to other connections and the weight of the priority onto an ATM network; and
   transmitting from the source traffic of another connection having unknown traffic characteristics regarding the traffic itself with no parameters specified without a weighted priority relative to other connections onto the ATM network.

21. A method as described in claim 20 including before the step of transmitting the traffic of the connection having unknown traffic characteristics with a weighted priority, there is the step of assigning a priority to the connection having unknown traffic characteristics with a weighted priority.

22. A method has described in claim 21 including after the assigning step, there is the step of sending a signaling message from the source to a switch on the network which is to receive the traffic of the connection having unknown traffic characteristics with a weighted priority so the switch sets up a scheduling process corresponding with the weight of the priority of the connection having unknown traffic characteristics with a weighted priority.

23. A method as described in claim 22 wherein the transmitting the traffic of the connection having unknown traffic characteristics with a weighted priority includes the step of transmitting traffic of a UBR connection with a weighted priority (UBRw VC) and the step of transmitting traffic of another connection having unknown traffic characteristics without a weighted priority includes the step of transmitting traffic of a UBR connection without a weighted priority (UBR VC).

24. A method as described in claim 23 including after the assigning step, there is the step of transmitting from the source traffic having known traffic characteristics of either ABR, CBR, VBR or a combination of the same.

25. A method as described in claim 24 including after the transmitting the UBRw VC step, there is the step of receiving the UBRw VC at the switch.

26. A method as described in claim 24 including after the receiving step, there is the step of scheduling the UBRw VC for transmission by the switch onto the network toward a destination based on weighted round robin.

27. A method as described in claim 26 including the step of communicating the priority of the connection during call set-up.

28. An ATM communication system comprising:
   a source which produces traffic for connections having known traffic characteristics of either ABR, CBR or VBR and unknown traffic characteristics of either UBR traffic and UBRw traffic with UBRw traffic being distinct from UBR traffic only by UBRw traffic having multiple weighted priorities relative to the connections;
   a network on which traffic travels, said source connected to said network, said source sends said traffic having known traffic characteristics of either ABR, CBR or VBR and unknown traffic characteristics of either UBR traffic and UBRw traffic onto the network and if the connection has a weighted priority, the weight of the priority is communicated to the network; and
   a destination which is connected to the network and receives the traffic having known traffic characteristics of either ABR, CBR or VBR and unknown traffic characteristics of either UBR traffic and UBRw traffic.

29. A source for producing ATM traffic for a network with switches comprising:
   a mechanism which produces traffic for connections having known traffic characteristics of either ABR, CBR or VBR and unknown traffic characteristics of either having UBR traffic or UBRw traffic with UBRw traffic being distinct from UBR traffic only by UBRw traffic having multiple weighted priorities relative to the connections; and
   a mechanism for transmitting the traffic to the network and if the connection has a weighted priority, the weight of the priority is communicated to the network.

30. A switch for switching traffic on an ATM network from a source to a destination comprising:
   a mechanism for receiving traffic for connections having known traffic characteristics of either ABR, CBR, VBR and unknown traffic characteristics of either UBR traffic or UBRw traffic with UBRw traffic being distinct from UBR traffic only by UBRw traffic having multiple weighted priorities relative to the connections and if the connection has a weighted priority, the weight of the priority is communicated from the network;
   a mechanism for transmitting the traffic for connections to the network, said transmitting mechanism connected to the receiving mechanism; and
   a scheduler for scheduling when the connections having ABR, CBR, VBR, UBR traffic or UBRw traffic are to be transmitted to the network, said scheduler connected to the transmitting mechanism and the receiving mechanism.

* * * * *